United States Patent [19]

Gasper et al.

[11] Patent Number: 4,999,505
[45] Date of Patent: Mar. 12, 1991

[54] TRANSPARENT RADIATION IMAGE STORAGE PANEL

[75] Inventors: John Gasper, Hilton; Robert W. Kulpinski, Rochester; Anthony R. Lubinsky, Webster, all of N.Y.

[73] Assignee: Eastman Kodak Company, Rochester, N.Y.

[21] Appl. No.: 476,918

[22] Filed: Feb. 8, 1990

[51] Int. Cl.$^5$ .............................................. G21K 4/00
[52] U.S. Cl. .............................. 250/484.1; 250/487.1
[58] Field of Search ............... 250/327.2, 484.1, 487.1

[56] References Cited

U.S. PATENT DOCUMENTS

| | | | |
|---|---|---|---|
| Re. 31,847 | 3/1985 | Luckey | 250/327.2 |
| 3,444,372 | 5/1969 | De Hart | 250/327.2 |
| 3,944,835 | 3/1976 | Vosburgh | 250/368 |
| 4,368,390 | 1/1983 | Takahashi et al. | 250/486.1 |
| 4,394,581 | 7/1983 | Takahashi et al. | 250/484.1 B |
| 4,571,496 | 2/1986 | Arakawa | 250/484.1 B |
| 4,585,944 | 4/1986 | Teraoka | 250/484.1 B |
| 4,603,260 | 7/1986 | Takano | 250/484.1 B |
| 4,604,525 | 8/1986 | Kitada et al. | 250/484.1 B |
| 4,661,704 | 4/1987 | deLeeuw et al. | 250/484.1 B |
| 4,778,995 | 10/1988 | Kulpinski et al. | 250/368 |

FOREIGN PATENT DOCUMENTS 1175647 10/1984 Canada.
69273 6/1979 Japan.

OTHER PUBLICATIONS

"Laser-Stimulable Transparent C$_5$I:Na Film for a High/or a High Quality X-ray Image Sensor," by Kano et al., Applied Phys. Letters 48(17) Apr. 28, 1986, pp. 1117–1118.

Primary Examiner—Carolyn E. Fields
Attorney, Agent, or Firm—Thomas H. Close

[57] ABSTRACT

A radiation image storage panel includes a layer of transparent stimulable phosphor, a filter layer for strongly absorbing stimulating radiation and transmitting emitted radiation, and a radiation diffusing layer. The filter layer absorbs the beam of stimulating radiation so that an image recorded in the storage panel is not blurred by scattered stimulating radiation during readout, and the diffusing layer increases the escape efficiency of the emitted light from the storage panel.

5 Claims, 2 Drawing Sheets

TRANSPARENT RADIATION IMAGE STORAGE PANEL

TECHNICAL FIELD OF THE INVENTION

This invention relates to a radiation image storage panel for recording and reproducing a radiation image using a stimulable phosphor which is exposed by short wavelength radiation to form a latent image, and is read out by stimulating with long wavelength radiation to emit intermediate wavelength radiation, and more particularly to such a storage panel having a stimulable phosphor which is transparent to stimulating and emitted radiation. The term "transparent" as used herein with respect to stimulable phosphor means substantially non-scattering.

BACKGROUND OF THE INVENTION

In a photostimulable phosphor imaging system, as described in U.S. Pat. No. Re. 31,847 reissued Mar. 12, 1985 to Luckey, an image storage panel comprising a photostimulable phosphor is exposed to an image wise pattern of high energy short wavelength radiation, such as x-radiation, to record a latent image pattern in the image storage panel. The latent image is read out by stimulating the phosphor with a relatively long wavelength stimulating radiation, such as red or infrared light. Upon stimulation, the photostimulable phosphor releases emitted radiation of an intermediate wavelength, such as blue or violet light, in proportion to the quantity of short wavelength radiation that was received. To produce a signal useful in electronic image processing, the image storage panel is scanned in a raster pattern by a beam of stimulating radiation produced for example by an infrared laser deflected by an oscillating or rotating scanning mirror, and the emitted radiation is sensed by a photodetector such as a photomultiplier tube, to produce the electronic image signal.

In the conventional photostimulable phosphor imaging systems, the image storage panel is turbid (i.e. scattering) to both stimulating and emitted wavelengths of light. In such a turbid storage panel system, the minimum pixel size, and hence the resolution that can be achieved, corresponds to the scattered area of the scanning beam within the storage panel itself. It has been proposed that the resolution of a photostimulable phosphor imaging system may be greatly improved by making the image storage panel transparent, thereby enabling a reduction in the effective pixel size, since the apparent size of the beam is not increased by scattering. See for example, the article entitled "Laser-Stimulable Transparent CsI: Na Film for a High Quality X-ray Image Sensor" by Kano et al, Applied Physics Letters 48(17), Apr.28, 1986.

Since the MTF (Modulation Transfer Function-a measure of the ability of the system to record details) of the transparent photostimulable phosphor imaging system is limited mainly by the effective size of the scanning beam of stimulating radiation, the x-ray absorption of the storage panel may be increased by making it thicker, without increasing the effective size of the scanning beam. In this way, the signal-to-noise ratio of the x-ray detector may be improved. In the conventional turbid storage panels, the thickness was limited by the spreading of the scanning beam in the panel.

Unfortunately, the transparent storage panel has a drawback, in that a large fraction of the emitted light is totally internally reflected within the transparent storage panel and is not collected by conventional light detectors. The only emitted light that escapes from the surface of the transparent storage panel is that which is emitted in the solid angle subtended by the light rays incident at less than a critical angle to the surface.

FIG. 4 illustrates this problem of recovering emitted light from a transparent storage panel. A scanning beams of stimulating radiation is directed onto one side of a transparent image storage panel 10 having an index of refraction $n_p > 1$. The scanning beam stimulates the emission of light in all directions within the storage panel 10. Only the emitted light rays within a solid angle subtended by angle $\theta_c$ (illustrated by solid lines in FIG. 4) can escape from the surface of the transparent storage panel 10. The rest of the rays (represented by dashed lines in FIG. 4) are trapped within the phosphor sheet by total internal reflection. The critical angle $\theta_c$ for total internal reflection is defined as:

$$\sin \theta_c = \frac{n_{air}}{n_p} \quad (1)$$

where $n_{air}$ is the index of refraction for air = 1.

In terms of solid angle, the ratio $\epsilon$ (herein called escape efficiency) of the emitted light escaping from one side of the sheet to the total light emitted from the phosphor is expressed as:

$$\epsilon = 2\pi \left[ 1 - \left( 1 - \frac{1}{n_p{}^2} \right)^{\frac{1}{2}} \right] / 4\pi. \quad (2)$$

The total emitted light escaping from both the top and bottom of the sheet is proportional to $2\epsilon$. For a transparent storage panel having an index of refraction of 1.6, this means that only about 11% of the light escapes from the top of the panel, and another 11% from the bottom, the remainder of the light is trapped within the panel by total internal reflection.

Collectors may be located on both sides of the storage panel to collect a total of 22% of the emitted light. Alternatively, a mirror surface can be placed on one side of the storage panel and light collected from the other side of the storage panel. In this case, the collection efficiently $\epsilon$ is:

$$\epsilon = \frac{1 + R}{2} \left[ 1 - \left( 1 - \frac{1}{n_p{}^2} \right)^{\frac{1}{2}} \right] \quad (3)$$

where R is the reflectance of the mirror surface.

One solution to this problem is to employ a photostimulable phosphor sheet that comprises a photostimulable phosphor dispersed in a polymeric binder. The polymeric binder is selected such that its index of refraction matches that of the phosphor at the stimulating wavelength, but does not match that of the phosphor at the emitted wavelength. Thus, the emitted wavelength is scattered and is not trapped by total internal reflection, while the benefits of the transparent phosphur sheet are achieved for the stimulating wavelength. See Canadian Patent No. 1,175,647 issued Oct. 9, 1984 to Deboer and Luckey. Although the solution is ideal for a phosphor-binder type photostimulable medium, it does not solve the problem for an isotropic photostimulable medium such as the fused phosphor described in the above-referenced Kano et al. article. Furthermore, even in a phosphor-binder type photostimulable medium, the desired indices of refraction are difficult to achieve in practice. A rapid change in the index of refraction of a material with changes in wavelength, which is necessary for the phosphor-binder system to be transparent to stimulating wavelength and turbid for the emitted wavelength of light, is generally associated with an absorption peak. Obviously, the presence of an absorption peak near the wavelengths of interest is to be avoided if maximum efficiency is to be achieved from the system.

It is the object of the present invention to provide a radiation image storage panel having a transparent stimulable phosphor with an improved escape efficiency for emitted light.

SUMMARY OF THE INVENTION

The object is achieved according to the inventioin by an image storage panel having a layer of transparent stimulable phosphor material, a filter layer that strongly absorbs stimulating radiation and transmits emitted radiation, and a radiation diffusing layer that diffuses emitted radiation. In one embodiment, the radiation diffusing layer is a translucent layer and emitted light is collected from the side of the phosphor panel opposite the side receiving the stimulating radiation. In an improvement of this arrangement, a dichroic mirror that passes stimulating light and reflects emitted light is provided on the side of the phosphor panel receiving stimulating radiation.

In a presently preferred mode of carrying out the invention, the diffusing layer is a diffusely reflecting layer. Emitted light is collected from the same side of the storage panel as that which receives stimulating radiation.

MODES OF CARRYING OUR THE INVENTION

Figure 1:
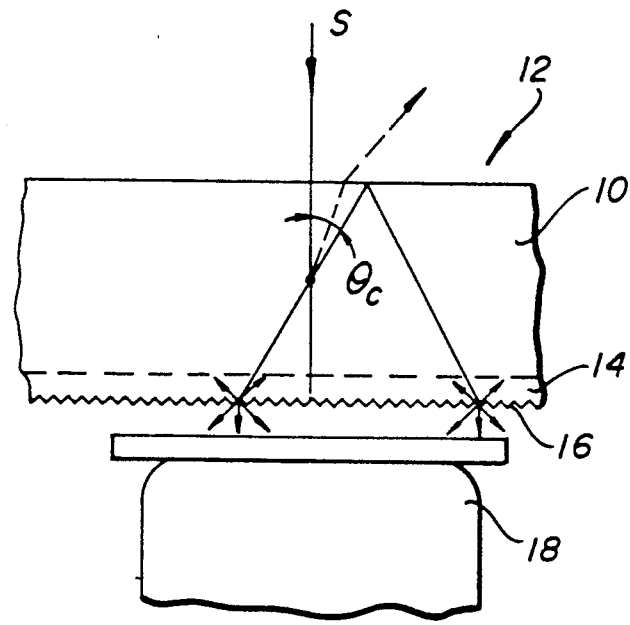
FIG. 1 is a schematic cross sectional view of a storage panel and light detector according to one mode of practicing the present invention.

FIG. 1 shows one mode of carrying out the present invention. An image storage panel 12 includes a layer 10 of transparent stimulable phosphor material. The transparent stimulable phosphor layer 10 may be composed of a stimulable phosphor powder in a matched index of refraction binder, or a fused stimulable phosphor. On the side of the transparent stimulable phosphor layer 10 opposite the side receiving a beam S of stimulating radiation, is a filter layer 14 for strongly absorbing stimulating radiation and passing emitted radiation. By strongly absorbing is meant that the filter has an optical density of $>1.5$ for stimulating wavelengths of radiation. And by transmitting emitted radiation is meant that the filter has an optical density of $<0.1$ for emitted radiation. Adjacent the filter layer 14 is a translucent radiation diffusing layer 16 for diffusing emitted radiation. The refractive indices for layers 14 and 16 are chosen to be equal to or slightly greater than the refractive indexes of the phosphor at the wavelength of emission to provide good optical coupling. The transparent stimulable phosphor layer may be self supporting, or formed by coating or deposition on an index matching support. Similarly, the filter layer may be self supporting or coated on an index matching support. In the event that the filter layer 14 is self supporting, it may provide the support for the transparent stimulable phosphor layer 10, and vice versa. The translucent radiation diffusing layer 16 may comprise a layer of translucent material, or may comprise a frosted surface on the filter 14, or a frosted surface on an index matched support (not shown).

The image storage panel 12 functions as follows: a beam of stimulating radiation S excites emitted radiation in the transparent stimulable phosphor layer 10. The filter layer 14 absorbs the stimulating beam S so that it is not reflected or scattered back into the stimulable phosphor layer (thereby preserving the high resolution capability of the transparent storage phosphor). The rays of emitted radiation that fall outside the critical angle $\theta_c$ proceed either directly or are internally reflected from the top surface, through the filter layer 14 to translucent diffusing layer 16, where they are scattered. Some of the light escapes through scattering, and the rest is returned to escape through or be reflected from the top surface. The light reflected from the top surface then undergoes scattering a second time and so on thereby increasing the escape efficiency. The emitted radiation escaping from the image storage panel is detected, for example by a photomultiplier tube 18.

Figure 2:
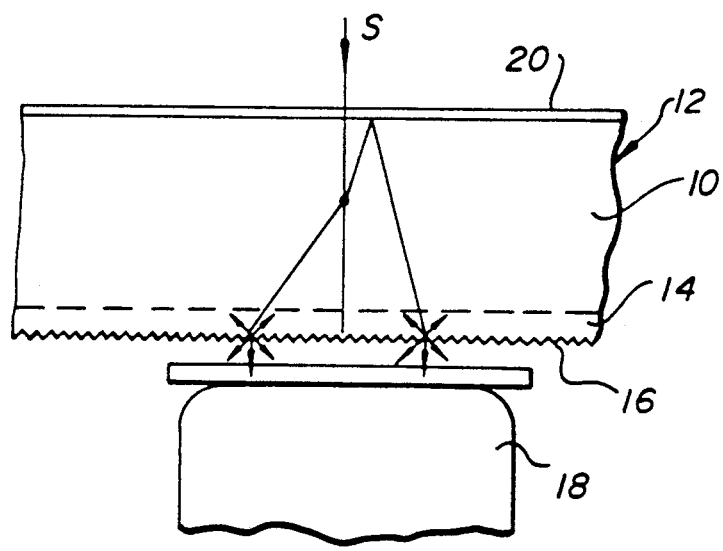
FIG. 2 is a schematic cross sectional view of a further improvement in the storage panel and light collector shown in FIG. 1.

The emitted light escaping from the top surface of the image storage panel may be collected by positioning a second collector/detector at the top of the storage panel. A collector/detector of the type discussed below with reference to FIG. 3 would be suitable for this purpose. Alternatively, a dichroic mirror that passes stimulating radiation and reflects emitted radiation may be placed over the top surface of the image storage panel. The dichroic mirror may be either be a part of the image storage readout apparatus, or may be included as an integral part of the image storage panel itself. FIG. 2 illustrates an image storage panel according to the present invention with an integral dichroic mirror 20 on the top surface of the transparent stimulable phosphor layer 10. All rays of emitted light reaching the top surface of the transparent storage phosphor layer are reflected to the bottom surface, where they are scattered. Each time a ray is scattered, some of the scattered light escapes from the storage panel.

Figure 3:
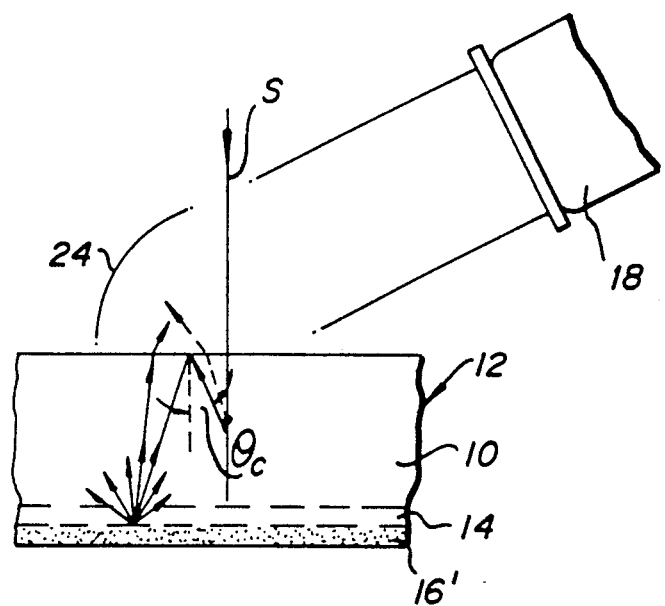
FIG. 3 is a schematic cross sectional view of a storage panel and light collector according to an alternative mode of practicing the present invention.
Figure 4:
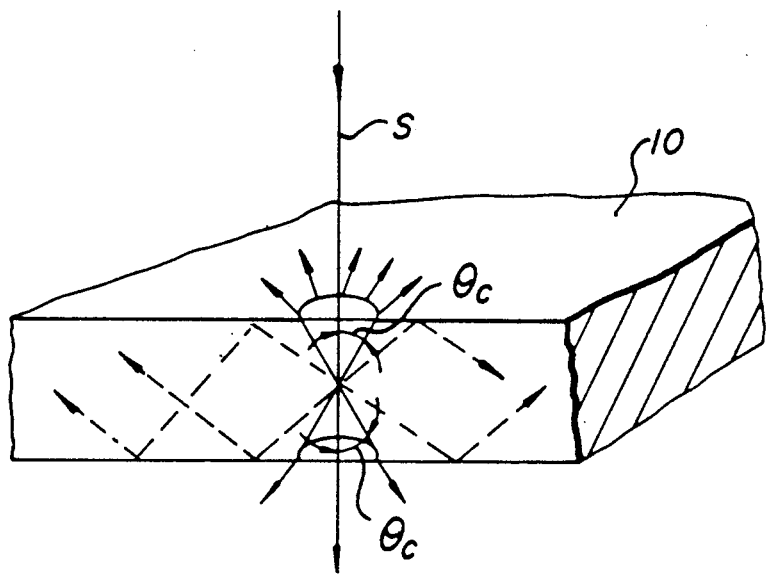
FIG. 4 is a schematic diagram useful in describing the background of the present invention.

FIG. 3 shows an image storage panel according to an alternative mode of practicing the present invention. In the mode shown in FIG. 3, the transparent stimulable phosphor layer 10 and the filter layer 14 are similar to those shown in FIG. 1, but the diffusing layer 16' is a diffusely reflecting layer rather than a translucent diffusing layer. The rays of emitted light that fall outside the solid angle $\Theta_c$ proceed either directly to or are totally internally reflected by the top surface to the diffusely reflecting layer 16". Each ray reaching the diffusely reflecting layer 16" is isotropically scattered in a lambertian distribution and upon once again reaching the top surface has another chance to escape thereby increasing the escape efficiency. Thus, assuming a perfect lambertian reflector and no losses in the filter or phosphor material, after many reflections all of the emitted light escapes from the image storage panel. In practice, the escape efficiency will be reduced because of weak absorption in the diffuse reflector, filter, and phosphor.

A transparent storage phosphor panel was prepared as follows: An unsupported screen was prepared by the procedure of Example 1 of DeBoer et al. U.S. Pat. No. 4,637,898 employing particulate thallium and strontium activated rubidium bromide as a storage phosphor accounting for 60 percent, by weight, of the unsupported screen. The storage phosphor was similar in composition to those disclosed by Shimada et al. EP 0 174 875. Cyclohexylmethacrylate and benzyl methacrylate in a 77:23 weight ratio were employed as photopolymerizable monomers. The unsupported screen exhibited a thickness of 1.225 mm and an optical transmittance of 65 percent at 633 nm. The unsupported screen was affixed to a 25 mm $\times$25 mm $\times$1 mm thick glass filter which functioned as a substrate support for the completed article. Adhesion was achieved by spreading a thin layer of the liquid monomers on the glass filter, seating the unsupported screen on this layer, and repeating the photopolymerization step. The glass filter was a Schott glass G6-25 filter.

COMPARATIVE EXAMPLE A

An anti-halation layer (black 2 mil treated acetate tape, 3M 800 black) was applied to the backside of the filter glass to obtain a baseline for comparison. The transparent storage phosphor image panel was then uniformly expoxed to x-rays and stimulation rays of a Helium Neon laser. The emitted light was collected and detected as illustrated in FIG. 3 to establish a base line.

COMPARATIVE EXAMPLE B

The anti-halation layer was then replaced with a specular reflector made of aluminum deposited on a flexible plastic subtrate with a reflection of approximately 90% at the emission wavelength of the sample. The sample was again x-ray exposed and stimulated as in Example A. The detected signal was 1.82 times greater than the baseline.

WORKING EXAMPLE

The specular reflector was removed and replaced by a diffusely reflecting layer of polyethene tetra fluoride plastic (Spectralon Reflection Target as supplied by Labsphere, Inc. 98% measured reflectance at the peak emission wavelength of a 375 nm) and optically coupled to the filter glass with index matching silicon grease. The sample was again tested as in Example A. The detected signal was 2.56 times greater than the baseline.

The fact that the detected signal was greater than 2 times the baseline signal in Comparative Example A indicated that scattering of emitted light by the diffuse layer was enhancing the escape efficiency of emitted light from the transparent phosphor. Two times the signal in Comparative Example A is the maximum theoretical improvement by collecting from both sides or using a mirror on one side as in Comparative Example B.

INDUSTRIAL APPLICABILITY AND ADVANTAGES

The present invention is useful in stimulable phosphor imaging systems. It has the advantage of increasing the escape efficiency of emitted light from transparent stimulable phosphor image storage panel, thereby increasing the signal to noise ratio achievable with such transparent phosphor storage panels while maintaining their high resolution capability.

We claim:

1. A radiation image storage panel, comprising:
a transparent stimulable phosphor layer;
a filter layer for strongly absorbing stimulating radiation and transmitting emitted radiation; and
a radiation diffusing layer.

2. The storage panel claimed in claim 1, wherein said radiation diffusing layer is a translucent layer.

3. The storage panel claimed in claim 2, further including a dichroic mirror on the transparent stimulable phosphor layer for passing stimulating radiation and reflecting emitted radiation.

4. The storage panel claimed in claim 1, wherein said radiation diffusing layer comprises means for diffusively reflecting emitted radiation.

5. The storage panel claimed in claim 4, wherein said transparent stimulable phosphor layer is RbBrT1 in an index matched binder; said filter layer is a Schott glass G6-25 filter; and said radiation diffusing layer is diffusely reflective plastic.

* * * * *